(12) United States Patent
Siti (10) Patent No.: US 9,231,794 B2
(45) Date of Patent: Jan. 5, 2016

(54) METHOD AND APPARATUS FOR MULTIPLE ANTENNA COMMUNICATIONS, COMPUTER PROGRAM PRODUCT THEREFOR

(75) Inventor: Massimiliano Siti, Peschiera Borromeo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 812 days.

(21) Appl. No.: 12/531,297

(22) PCT Filed: Mar. 14, 2007

(86) PCT No.: PCT/IB2007/000629
§ 371 (c)(1),
(2), (4) Date: Sep. 14, 2009

(87) PCT Pub. No.: WO2008/110854
PCT Pub. Date: Sep. 18, 2008

(65) Prior Publication Data
US 2010/0111160 A1    May 6, 2010

Related U.S. Application Data

(63) Continuation-in-part of application No. 11/989,055, filed as application No. PCT/US2006/028256 on Jul. 20, 2006, now Pat. No. 8,351,529.

(60) Provisional application No. 60/700,773, filed on Jul. 20, 2005.

(51) Int. Cl.
*H04L 27/01* (2006.01)
*H04L 27/06* (2006.01)
(Continued)

(52) U.S. Cl.
CPC .......... *H04L 25/03318* (2013.01); *H04L 1/005* (2013.01); *H04L 25/03006* (2013.01); *H04L 27/2601* (2013.01); *H04L 2025/03426* (2013.01)

(58) Field of Classification Search
CPC .... H04B 1/71057; H04L 1/06; H04L 1/0631; H04L 2025/03426; H04L 25/0246
USPC ................................................ 375/341, 260
See application file for complete search history.

(56) References Cited

U.S. PATENT DOCUMENTS 6,687,492 B1    2/2004  Sugar et al.
6,775,260 B1    8/2004  Dabak et al.
(Continued)

FOREIGN PATENT DOCUMENTS

EP    1460813    9/2004
EP    1471655    10/2004
(Continued)

OTHER PUBLICATIONS

I. Emre Telatar, "Capacity of Multi-Antenna Gaussian Channels," Eur. Trans. Tel, 10, 6, 585-595, Nov. 1999, pp. 28.
(Continued)

*Primary Examiner* — Shuwang Liu
*Assistant Examiner* — Ross Varndell
(74) *Attorney, Agent, or Firm* — Seed IP Law Group PLLC (57) ABSTRACT

Embodiments of a method and an apparatus for detecting multiple complex-valued symbols belonging to discrete constellations. The method and apparatus is a detector that finds a closest vector, or a close approximation of it, to a received vector. The disclosure also gets (optimally, in case of two transmit sources) or closely approximates (for more than two transmit sources) the most likely sequences required for an optimal bit or symbol a-posteriori probability computation. Also part of the present disclosure is represented by Also embodiments of a method and an apparatus to determine a near-optimal ordering algorithms for the aforementioned purpose. The method and apparatus achieves optimal performance for two transmit antennas and achieves near-optimal performance for a higher number of antennas, with a lower complexity as compared to a maximum-likelihood detection method and apparatus. The method and apparatus are suitable for highly parallel hardware architectures.

38 Claims, 5 Drawing Sheets

(51) Int. Cl.
| | |
|---|---|
| H04L 27/38 | (2006.01) |
| H04L 27/18 | (2006.01) |
| H04L 25/03 | (2006.01) |
| H04L 1/00 | (2006.01) |
| H04L 27/26 | (2006.01) |

(56) References Cited

U.S. PATENT DOCUMENTS

| | | | |
|---|---|---|---|
| 7,251,768 B2* | 7/2007 | Giannakis et al. | 714/755 |
| 7,349,496 B2 | 3/2008 | Jia et al. | |
| 7,372,896 B2 | 5/2008 | Bjerke et al. | |
| 7,489,746 B1* | 2/2009 | Awater et al. | 375/341 |
| 7,551,664 B2 | 6/2009 | Zhang et al. | |
| 7,616,695 B1 | 11/2009 | Sarrigeorgidis | |
| 8,069,399 B2 | 11/2011 | Osnato et al. | |
| 8,351,529 B2* | 1/2013 | Siti et al. | 375/267 |
| 9,014,253 B2* | 4/2015 | Siti et al. | 375/233 |
| 2002/0126772 A1 | 9/2002 | Brunel | |
| 2003/0236076 A1* | 12/2003 | Brunel | 455/101 |
| 2004/0076248 A1 | 4/2004 | Purho | |
| 2004/0095993 A1 | 5/2004 | Liu et al. | |
| 2004/0174939 A1 | 9/2004 | Wang | |
| 2005/0135498 A1 | 6/2005 | Yee | |
| 2005/0175122 A1 | 8/2005 | Nefedov et al. | |
| 2005/0281351 A1 | 12/2005 | Jeong et al. | |
| 2006/0104340 A1* | 5/2006 | Walton et al. | 375/227 |
| 2006/0188044 A1* | 8/2006 | Wang et al. | 375/347 |
| 2006/0285531 A1 | 12/2006 | Howard et al. | |
| 2008/0310554 A1 | 12/2008 | Siti et al. | |
| 2009/0154599 A1* | 6/2009 | Siti et al. | 375/320 |
| 2010/0111160 A1 | 5/2010 | Siti | |
| 2013/0215955 A1 | 8/2013 | Siti et al. | |

FOREIGN PATENT DOCUMENTS

| | | |
|---|---|---|
| EP | 1521414 | 4/2005 |
| JP | 2004282757 | 10/2004 |
| JP | 2005176020 | 6/2005 |
| WO | 2004054191 | 6/2004 |
| WO | 2005034455 | 4/2005 |
| WO | 2007012053 | 1/2007 |

OTHER PUBLICATIONS

G.J. Foschini and M. Gans, "On the Limits of Wireless Communication in a Fading Environment," Wireless Pers. Comm., 6, 311-355, Mar. 1998.

IEEE P802.11n™/D2.0, "Draft Amendment to [. . . ]—Part 11 : Wireless LAN Medium Access Control (MAC) and Physical Layer (PHY) specifications: Enhancements for Higher Throughput", A. Stephens et al., pp. 498.

IEEE Project P802.16/2004/Cor1-D5, Draft Corrigendum to IEEE Standard for Local and Metropolitan Area Networks—Part 16: Air Interface for Fixed Broadband Wireless Access Systems, pp. 288.

Requirements and recommendations for WiMAX Forum™ Mobility Profiles, WiMAX1 Service Providers Working Group, Nov. 9, 2005, pp. 34.

W. van Etten, "Maximum Likelihood Receiver for Multiple Channel Transmission Systems", IEEE Trans, on Comms, vol. 24, No. 2, Feb. 1976, pp. 276-283.

H. Vincent Poor and Sergio Verdu', "Probability of Error in MMSE Multiuser Detection", IEEE Trans, on Information Theory, vol. 43, No. 3, May 1997, pp. 858-871.

P. W. Wolniansky, G. J. Foschini, G. D. Golden, R. A. Valenzuela, "V-BLAST: An Architecture for Realizing Very High Data Rates Over the Rich-Scattering Wireless Channel," invited paper, Proc. ISSSE-98, Pisa, Italy, Sep. 29, 1998, pp. 6.

G. J. Foschini, G. D. Golden, R. A. Valenzuela, P. W. Wolniansky, "Simplified Processing for High Spectral Efficiency Wireless Communications employing multi-element arrays," IEEE Journal on Selected Areas in Communications, vol. 17, No. 11, Nov. 1999, pp. 1841-1852.

Won-Joon Choi, Rohit Negi and John M. Cioffi, "Combined ML and DFE Decoding for the V-BLAST System", Proc. IEEE Int. Conf. on Communications, vol. 3, Jun. 2000, pp. 1243-1248.

Yuan Li and Zhi-Quan Luo, "Parallel Detection for V-BLAST System", IEEE Globecom, vol. 1, May 2002, pp. 340-344.

Deric W. Waters and John R. Barry, "The Chase Family of Detection Algorithms for Multiple-Input Multiple-Ouput Channels", IEEE Globecom, vol. 4, Nov. 2004, pp. 2635-2639.

Deric W. Waters and John R. Barry, "The Chase Family of Detection Algorithms for Multiple-Input Multiple-Ouput Channels", Submitted to IEEE Trans, on Information Theory, Sep. 2005.

Luis G. Barbero and John S. Thompson, "Rapid Prototyping of a Fixed-Throughput Sphere Decoder for MIMO Systems", IEEE Int. Conf. on Communications, Jun. 2006, pp. 6.

Erik Agrell, Thomas Eriksson, Alexander Vardy, and Kenneth Zeger, "Closest Point Search in Lattices," IEEE Trans, on Inf. Theory, vol. 48, No. 8, Aug. 2002, pp. 13.

Oussama Damen, Ammar Chkeif and Jean-Claude Belfiore, "Lattice Codes Decoder for Space-Time Codes", IEEE Communications Letters, vol. 4, No. 5, May 2000, pp. 161-163.

Emanuele Viterbo, Joseph Boutros, "A Universal Lattice Code Decoder for Fading Channels," IEEE Transactions on Information Theory, vol. 45, No. 5, Jul. 1999, pp. 4.

Mohamed Oussama Damen, Hesham El Gamal, Giuseppe Caire, "On Maximum-Likelihood Detection and the Search for the Closest Lattice Point," IEEE Transactions on Information Theory, vol. 49, No. 10, Oct. 2003, pp. 14.

Andreas Burg, Moritz Borgmann, Markus Wenk, Martin Zellweger, Wolfgang Fichtner, and Helmut Bolcskei, "VLSI implementation of MIMO detection using the sphere decoding algorithm", IEEE Journal of Solid-State Circuits, vol. 40, No. 7, Jul. 2005, pp. 1566-1577.

Richard van Nee, Ailed van Zelst,and Geert Awater, "Maximum likelihood decoding in a space division multiplexing system," Proc. VTC 2000, vol. 1 , 6-10.

IEEE 802.11-05/0149r1 , "WWiSE Proposal: High throughput extension to the 802.11 Standard," C. Kose, B. Edwards et al., Jan. 2005, pp. 91.

Babak Hassibi, "An efficient square-root algorithm for BLAST," in Proc. ICASSP, Istanbul, Turkey, Jun. 2000, pp. 11737-11740.

D. Wübben, R. Bóhnke, J. Rinas, V. Kühn, and K. Kammeyer, "Efficient algorithm for decoding layered space-time codes," Electronic Letters, vol. 37, No. 22, Oct. 2001, pp. 1348-1350.

Deric W. Waters and John R. Barry, "Noise-predictive decision-feedback detection for multiple-input multiple-output channels," in press, IEEE Transactions on Signal Processing, vol. 53, No. 5, May 2005, pp. 1852-1859.

Bertrand M. Hochwald, Stephan ten Brink, "Achieving Near-Capacity on a Multiple-Antenna Channel," IEEE Trans, on Comms., vol. 51 , No. 3, Mar. 2003, pp. 30.

Mong Suan Yee, "Max-log Sphere Decoder," ICASSP 2005, pp. 4.

Joseph Boutros, Nicolas Gresset, Loic Brunel and Marc Fossorier, "Soft-input soft-output lattice sphere decoder for linear channels," Globecom 2003, pp. 5.

IEEE 802.11-04/898r1, N. Moschini, M. Siti et al., "STMicroelectronics Partial Proposal for LDPCC as optional coding technique for IEEE 802.11 TGn High Troughput Standard", Aug. 2004, pp. 44.

Damien Zuyderhoff, Xavier Wautelet, Antoine Dejonghe and Luc Vandendorpe, "MMSE Turbo Receiver for space-frequency bit-interleaved coded OFDM", IEEE Vehicular Technology Conference, vol. 1 , Oct. 2003, pp. 567-571.

IEEE 802.11-031940r4, "IEEE P802.11 , Wireless LANs—TGn Channel Models" —May 2004, pp. 49.

Arul D. Murugan, Hesham El Gamal, Mohamed Oussama Damen and Giuseppe Caire, "A Unified Framework for Tree Search Decoding: Rediscovering the Sequential Decoder", submitted to IEEE Transactions on Information Theory,vol. 52, No. 3, Mar. 2006, pp. 21.

G. H. Golub and C. F. Van Loan, "Matrix Computations", Johns Hopkins University Press, Baltimore, MD, 1996, chapter 4, "Special Linear System", pp. 75.

G. H. Golub and C. F. Van Loan, "Matrix Computations", Johns Hopkins University Press, Baltimore, MD, 1996, chapter 5, "Orthogonalization and Least Squares", pp. 71.

(56) References Cited

OTHER PUBLICATIONS

Deric W. Waters and John R. Barry, "The Sorted-QR Chase Detector for Multiple-Input Multiple-Output Channels", IEEE Communications Society, Wireless Communications and Networking Conference, 2005 IEEE New Orleans, LA, USA Mar. 13-17, 2005, pp. 538-543.

Claude Berrou, Alain Glavieux and Punya Thitimajshima, "Near Shannon limit error-correcting coding and decoding: Turbo-codes", Proc. ICC 1993, May 1993, pp. 1064-1070.

Catherine Douillard, Michel Jezequel, Claude Berrou, Annie Picart, Pierre Didier and Alain Glavieux, "Iterative Correction of Intersymbol Interference: Turbo-Equalization", European Trans. on Telecomm. and Rel. Techn., vol. 6, Sep. 1995, pp. 507-511.

Mathini Sellathurai and Simon Haykin, "Turbo-BLAST for Wireless Communications: Theory and Experiments", IEEE Transactions on Signal Processing, vol. 50, Oct. 2002, pp. 2538-2546.

Ben Lu, Guosen Yue, and Xiaodong Wang, "Performance Analysis and Design Optimization of LDPC-Coded MIMO OFDM Systems," IEEE Transactions on Signal Processing, vol. 52, No. 2, Feb. 2004, pp. 348-361.

Massimiliano Siti and Michael P. Fitz, "A Novel Soft-Output Layered Orthogonal Lattice Detector for Multiple Antenna Communications.", Proc. IEEE Int. Conf. on Communications, Jun. 2006.

Alessandro Tomasoni, Marco Ferrari, Devis Gatti, Fabio Osnato and Sandro Bellini, "A Low Complexity Turbo MMSE Receiver for W-LAN MIMO Systems", Proc. IEEEE Int. Conf. on Communications, Jun. 2006.

Yutaka Yasuda, Kanshiro Kashiki and Yasuo Hirata, "High-Rate Punctured Convolutional Codes for Soft Decision Viterbi Decoding", IEEE Transactions on Communications, vol. COM-32, No. 3, pp. 315-319, Mar. 1984.

S. Dolinar, D. Divsalar, "Weight Distributions for Turbo Codes Using Random and Nonrandom Permutations", JPL TDA Progr, Rep., vol. 42-122, pp. 56-65, Aug. 1995.

European Search Report, EP08152722, European Patent Office, Munich May 30, 2008.

Alessandro Tomasoni, Massimiliano Siti, Marco Ferrari, and Sandro Bellini, "Turbo-LORD: a MAP-approaching Soft-Input Soft-Output Detector for Iterative MIMO Receivers", Global Telecommunications Conference, 2007; IEEE Globecom 2007, pp. 3504-3508, XP031196593.

Massimiliano Siti and Michael P. Fitz, "On Layer Ordering Techniques for Near-optimal MIMO Detectors", 2007 8th IEEE Wireless Communications and Networking Conference, IEEE Piscataway, NJ, USA, 2007, pp. 1200-1205, XP007904694.

Massimiliano Siti and Michael P. Fitz, "On Reduced Complexity Soft-Output MIMO ML detection", IEEE Transactions on Information Theory, US, Mar. 24, 2006, pp. 1-43 XP007904695.

Emanuele Viterbo et al., "A Universal Lattice Code Decoder for Fading Channels", IEEE Transactions on Information Theory, vol. 45, No. 5, Jul. 1999, pp. 1639-1642.

Albert M. Chan et al., "A New Reduced-Complexity Sphere Decoder for Multiple Antenna Systems", 2002 IEEE, pp. 460-464.

International Search Report dated Oct. 20, 2006 from International Application No. PCT/US2006/028256, 3 pages.

Wubben, D., "Near-Maximum-Likelihood-Detection of MIMO System using MMSE-based Lattice Reduction", Jun. 2004, Communication, 2004 IEEE International Conference, vol. 2, pp. 798-802.

Notification of Transmittal of International Preliminary Report on Patentability dated May 21, 2008 in connection with PCT Application No. PCT/US06/28256.

\* cited by examiner

METHOD AND APPARATUS FOR MULTIPLE ANTENNA COMMUNICATIONS, COMPUTER PROGRAM PRODUCT THEREFOR

PRIORITY CLAIM

The present application is a United States National Phase Entry pursuant to 35 USC §371 of International Patent Application No. PCT/IB2007/000629, filed Mar. 14, 2007, and the present application is also a continuation-in-part of U.S. Pat. No. 8,351,529, filed Jan. 18, 2008, which patent is a United States National Phase Entry pursuant to 35 USC §371 of International Patent Application No. PCT/US2006/028256, filed 20 Jul. 2006, which application claims the benefit of U.S. Provisional Patent Application No. 60/700,773, filed 20 Jul. 2005. International Patent Application No. PCT/IB2007/000629 is incorporated herein by reference in its entirety.

TECHNICAL FIELD

An embodiment of the present disclosure relates to communication technology.

Specifically, an embodiment was developed by paying attention to its possible use in closely approximating a hard-output or soft output maximum-likelihood detector in multiple antenna communications.

BACKGROUND (Note: This application references various publications as indicated throughout the specification by reference numbers enclosed in brackets, e.g., [x]. A list of these publications ordered according to these reference numbers can be found below in the section entitled "References." Each of these publications is incorporated in its entirety by reference herein.)

Wireless transmission through multiple antennas, also referred to as MIMO (Multiple-Input Multiple-Output) [1]-[2], currently enjoys great popularity because of the demand of high data rate communication from multimedia services. Many applications are considering the use of MIMO to enhance the data rate and/or the robustness of the link; among others, a significant example is provided by the next generation of wireless LAN networks, of which the standard is currently under definition (IEEE 802.11n) [3]. Another candidate application is represented by mobile "WiMax" systems for fixed wireless access (FWA) [4]-[5]. Also, fourth generation (4G) mobile terminals will likely endorse MIMO technology and as such represent a very important commercial application for embodiments of the present disclosure.

An embodiment of the present disclosure is concerned with the problem of detecting multiple sources corrupted by noise in MIMO fading channels. The linear complex baseband equation representative of narrow band MIMO system is:

$$Y = HX + N \quad (1)$$

where R and T are the number of receive and transmit antennas respectively, $$Y = [Y_1 Y_2 \ldots Y_R]^T$$

is the received vector (size R×1), $$X = [X_1 X_2 \ldots X_T]^T$$

is the transmitted vector (size T×1), H is the R×T channel matrix, whose entries are the complex path gains from transmitter to receiver, samples of zero mean Gaussian random variables (RVs) with variance $\sigma^2 = 0.5$ per dimension. N is the noise vector of size R×1, whose elements are samples of independent circularly symmetric zero-mean complex Gaussian RVs with variance $\sigma_N^2 = N_0/2$ per dimension. Equation (1) is considered valid per subcarrier for wideband orthogonal frequency division multiplexing (OFDM) systems.

Maximum-Likelihood (ML) detection is desirable to achieve high-performance, as this is the optimal detection technique in presence of additive white Gaussian noise (AWGN) [6]. It corresponds to finding the transmitted vector X which minimizes the minimum of the squared norm of the error vector (i.e., its squared norm, $\|.\|^2$):

$$X^D = \operatorname*{argmin}_x \|Y - RX\|^2 \quad (2)$$

where the notation corresponds to the commonly used linear MIMO channel with i.i.d. Rayleigh fading and ideal channel state information (CSI) at the receiver is assumed. ML detection involves an exhaustive search over all the possible $S^T$ sequences of digitally modulated symbols, where S is a Quadrature Amplitude Modulation (QAM) or Phase Shift Keying (PSK) constellation size, and T is the number of transmit antennas; this means it becomes increasingly unfeasible with the growth of the spectral efficiency.

Because of their reduced complexity, sub-optimal linear detection algorithms like Zero-Forcing (ZF) or Minimum Mean Square Error (MMSE) [7] are widely employed in wireless communications. They belong to the class of linear combinatorial nulling detectors, i.e., the estimates of each modulated symbol are obtained considering the other symbols as interferers and performing a linear weighting of the signals received by all the receive antennas. ZF and MMSE schemes are highly sub-optimal, since they yield a low spatial diversity order: for a MIMO system with 7 transmit and R receive antennas, this is equal to R−T+1, as opposed to R for a ML [20].

To improve their performance, nonlinear detectors based on the combination of linear detectors and spatially ordered decision-feedback equalization (O-DFE) were proposed in [8]-[9]. There, the principles of interference cancellation and layer ordering are established. In the remainder of this document terms "layers" and "antennas" will be interchangeable.

First, a stage of ZF or MMSE linear detection, also called interference "nulling", is applied to determine T symbol estimates. Based on the "post-detection" signal-to-noise ratio (SNR), the first layer is detected. Then, each sub-stream in turn is considered to be the desired signal and the other are considered as "interferers"; interference from the already detected signals is cancelled from the received signal, and nulling is performed on modified received vectors where, effectively, fewer interferers are present. This process is called "interference cancellation (IC) and nulling" or, equivalently, spatial DFE. In case of IC, the order in which the transmit signals are detected is critical for the performance. An optimal criterion has been established, corresponding to maximizing the minimum SNR ("maxi-min" criterion) over all possible orderings. Fortunately, for T transmit antennas, it can be demonstrated that only T(T+1)/2 dispositions of layers have to be considered to determine the optimal ordering, instead of all the possible T!. However, nonlinear ZF or MMSE-based O-DFE detectors have a limited performance improvement over linear ZF or MMSE, due to noise enhancements caused by nulling and error propagation caused by IC. In addition, they still suffer from ill-conditioned channel conditions, as the linear detectors. Also, the complexity of the original version of this algorithm is very high, $O(T^4)$, as it involves the computation of multiple Moore-Penrose pseudo-inverse matrices of decreasing size sub-channel matrices. More recent efficient implementations exist [22], though, keeping a $O(T^3)$ complexity. Last, no strategy to compute the bit soft metrics has been proposed for O-DFE detectors.

A better performing class of detectors is represented by the list detectors [10]-[13], based on a combination of the ML and DFE principles. The common idea of the list detectors (LD) is to divide the streams to be detected into two groups: first, one or more reference transmit streams are selected and a corresponding list of candidate constellation symbols is determined; then, for each sequence in the list, interference is cancelled from the received signal and the remaining symbol estimates are determined by as many sub-detectors operating on reduced size sub-channels. Compared to O-DFE, the differences lie in the criterion adopted to order the layers, and in the fact that the symbol estimates for the first layer (i.e., prior to interference cancellation) are replaced by a list of candidates. The best performing variant corresponds to searching all possible S cases for a reference stream, or layer, and adopting spatial DFE for a properly selected set of the remaining $T-1$ sub-detectors. In this case, numerical results demonstrate that the LD detector is able to achieve full receive diversity and a SNR distance from ML in the order of fractions of dB, provided that the layer order is properly selected. A notable property is that this can be accomplished through a parallel implementation, as the sub-detectors can operate independently. The optimal ordering criterion for LDs stems from the principle of maximizing the worst case post-detection SNR ("maxi-min"), as proposed for the O-DFE [9]. This was first proposed in [11] and then re-elaborated in [12]-[13], and results in computing the O-DFE ordering for T sub-channel matrices of size $R\times(T-1)$ thus entailing a complexity $O(T^4)$. A simplified suboptimal ordering criterion is contained in both [13] and [14].

The LDs may also suffer from some major drawbacks. In particular, we refer to the "parallel detection" (PD) algorithm [11] and the additional implementation details contained in [12]-[13]. They all suffer from a high computational complexity as T O-DFE detectors acting on $R\times(T-1)$ sub-channel matrices have to be computed; this involves the computation of the related Moore-Penrose sub-channel pseudo-inverses. In [12]-[13] they are efficiently implemented through T complex "sorted" QR decompositions [23]-[24], however its overall complexity is still in the order of $O(T^4)$. As previously mentioned, a simplified suboptimal ordering method is included in [13] and [14]. In the case when all the possible constellation symbols are searched for a reference layer and the rest of the layers are detected through spatial DFE, such an ordering technique corresponds to selecting as reference layer the one characterized by the worst case post-detection SNR; then O-DFE is performed on the remaining layers. However, in [13] this criterion is only drafted as a possible simplification of the optimal layer selection algorithm but neither its HW complexity nor the performance is provided; [14] provides only one simulation plot for an uncoded 4×4 16QAM MIMO system, but its processing uses a complex-domain Cholesky decomposition of the channel matrix to compute its pseudo-inverse, which entails high complexity too. Finally, another major shortcoming in list based detection is, to the best of our knowledge, the absence of an algorithm to produce soft bit metrics for use in modern coding and decoding algorithms.

Finally, it shall be remarked that another important family of ML-approaching detectors is given by the lattice decoding algorithms, applicable if the received signal can be represented as a lattice [15]-[16], i.e., through a proper real-domain representation of discrete signals. The so-called Sphere Decoder (SD) [17]-[18] is the most widely known example for these detectors and can be utilized to attain hard-output ML performance with significantly reduced complexity.

However SD may suffer from some important disadvantages; most notably, it is not suitable for a parallel VLSI implementation. This because it is a inherently serial detector. In other words, it spans the possible values for the I and Q PAM components of the QAM symbols successively and thus is not suitable for a parallel implementation. It should be noted that in order to slightly increase the degree of achievable parallelism, the authors in [19] resort to a complex domain version of the SD algorithm.

A related issue is that the number of lattice points to be searched is non-deterministic, sensitive to the channel and noise realizations, and to the initial radius. This is not desirable for real-time high-data rate applications; an example is given by high-throughput Wireless LANs 802.11n, whose standard definition is ongoing [3].

Finally, generation of soft output metrics may not be easy with known lattice decoding procedures, because the need to reduce the size of the search before converging to the ML-approaching transmitted sequence is not always compatible with the need of finding a number of (selected) sequences in order to generate bit soft-output information.

Besides performance (the benchmarks are optimal ML detection and linear MMSE, ZF on the two extremes, respectively) at least four features are typically needed for a MIMO detection algorithm to be effective and implementable in next generation wireless communication algorithms:
a reduced overall complexity;
near optimal performance;
the possibility to generate bit soft output values (or log-likelihood ratios, LLR, if in the logarithmic domain), as this yields a significant performance gain in wireless systems employing error correction codes (ECC) coding and decoding algorithms;
the capability of the architecture of the procedure to be parallelized, which is significant for an Application Specific Integrated Circuit (ASIC) implementation and also to yield the low latency often required by a real-time high-data rate transmission.

SUMMARY

An embodiment of the disclosure provides a fully satisfactory response to the requirements described above, while also avoiding the shortcomings and drawbacks of the prior art arrangements as discussed in the foregoing.

An embodiment of the present disclosure relates to a method, a corresponding apparatus (a detector and a related receiver), and a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is intended to highlight the possibility for an embodiment of the present disclosure to be implemented in a distributed/modular fashion.

A purpose of an embodiment described herein is to provide a method and an apparatus to detect sequences of digitally modulated symbols, transmitted by multiple sources (e.g., antennas) and find a closest vector (optimally, for two transmit antennas), or a close approximation of it (for more than two transmit antennas), to a received vector. An embodiment described herein also computes (optimally, in case of two transmit sources) or closely approximates (for more than two transmit sources) soft output information, i.e., bit or symbol a-posteriori probabilities (APP).

An embodiment described herein is a detector wherein the detector achieves optimal or near-optimal performance using two or more than two transmit antennas respectively. In brief, the embodiment provides a simplified yet near-optimal method to compute equation (2) and related soft-output information.

Another embodiment concerns a detector comprising several stages. Firstly, the (complex) channel matrix undergoes a "triangularization" process, meaning that through proper processing it is factorized in two or more product matrices of which one is triangular. Then, the minimization problem expressed by equation (2) above is approximated by decoupling the problem as a function of some selected reference antenna (or source), and overall determining a suitable subset of all the possible transmit sequences. An important means to maintain low complexity is to resort to the principle of successive layer detection, or spatial DFE. Advantageously, the arrangement described herein may involve ordering all, or part of, the sequence of layers considered for the detection process.

An embodiment described herein is suitable for highly parallel hardware architectures, and is thus adapted for VLSI implementations and for applications requiring a real-time (or in any case low latency) response.

Specifically, an embodiment described herein concerns a detector of multiple antenna communications, that finds a closest or a close approximation of a transmitted vector, to a received vector. An embodiment described herein is also able to compute soft output information, i.e., bit or symbol a-posteriori APPs. Additionally and optionally, all—or part of—the layers considered for the detection may be ordered employing a suitably designed ordering technique. A layer ordering method includes the following sequence of steps, to be repeated a given number of times according to the implemented ordering technique: permuting pairs of columns of the channel matrix; pre-processing the permuted channel matrix in order to factorize it into product terms of which one is a triangular matrix; based on the processed channel coefficients, defining and properly computing the post-processing SNR for the considered layers; based on the value of the aforementioned SNRs, determining the order of the layers by applying a given criterion.

BRIEF DESCRIPTION OF THE DRAWINGS

For a more complete understanding of this disclosure and its features, reference is now made to the following description of exemplary embodiments, taken in conjunction with the accompanying drawings.

DETAILED DESCRIPTION

FIGS. 1A through 5B and the various embodiments described in this disclosure are by way of illustration only and should not be construed in any way to limit the scope of the disclosure. Those skilled in the art will recognize that the various embodiments described in this disclosure may easily be modified and that such modifications fall within the scope of this disclosure.

Figure 1A:
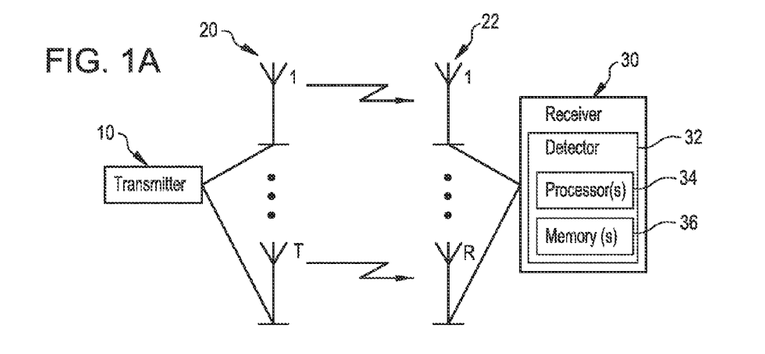
FIGS. 1A and 1B illustrate embodiments of systems for detecting communications from multiple sources.
Figure 1B:
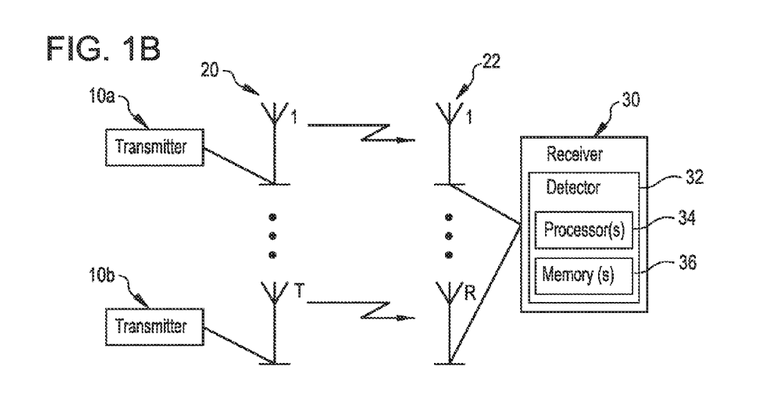

FIGS. 1A and 1B illustrate exemplary systems for detecting multiple communication sources. In particular, FIGS. 1A and 1B illustrate example MIMO systems. These embodiments are for illustration only. Other embodiments of the systems could be used without departing from the scope of this disclosure.

As shown in FIG. 1A, the system includes a transmitter 10 and a receiver 30. The transmitter 10 includes or is coupled to multiple transmit antennas 20 (denoted 1-T), and the receiver 30 includes or is coupled to multiple receive antennas 22 (denoted 1-R).

As shown in FIG. 1B, the system may also include multiple transmitters 10a-10t and the receiver 30. In this example, each of the transmitters 10a-10t includes or is coupled to a single transmit antenna 20.

Each of the transmitters 10, 10a-10t in FIGS. 1A and 1B represents any suitable device or component capable of generating or providing data for communication. The receiver 30 represents any suitable device or component capable of receiving communicated data.

In these examples, the receiver 30 includes a detector 32, which detects multiple communications from multiple sources and computes a-posteriori soft-output information. The multiple sources may include a single transmitter 10 with multiple antennas 20, multiple transmitters 10a-10t with one or several antennas 20 each, or a combination thereof. The detector 32 may operate as described in more detail below.

The block 32 includes any hardware, software, firmware, or combination thereof for detecting multiple communications from multiple sources. The block 32 may be implemented in any suitable manner, such as by using an Application Specific Integrated Circuit ("ASIC"), Field Programmable Gate Array ("FPGA"), digital signal processor ("DSP"), or microprocessor. As a particular example, the block 32 could include one or more processors 34 and one or more memories 36 capable of storing data and instructions used by the processors 34.

Either of the systems can be represented as in equation (1) above, which may be valid for both single-carrier flat fading MIMO systems and for wideband OFDM systems (per sub-carrier). The interpretation of equation (1) is that the signal received at each antenna 22 by the receiver 30 represents the superposition of T transmitted signals corrupted by multiplicative fading and AWGN.

Although FIGS. 1A and 1B illustrate examples of systems for detecting multiple communication sources, various changes may be made to FIGS. 1A and 1B. For example, a system could include any number of transmitters and any number of receivers. Also, each of the transmitters and receivers could include or be coupled to any number of antennas.

Figure 2:
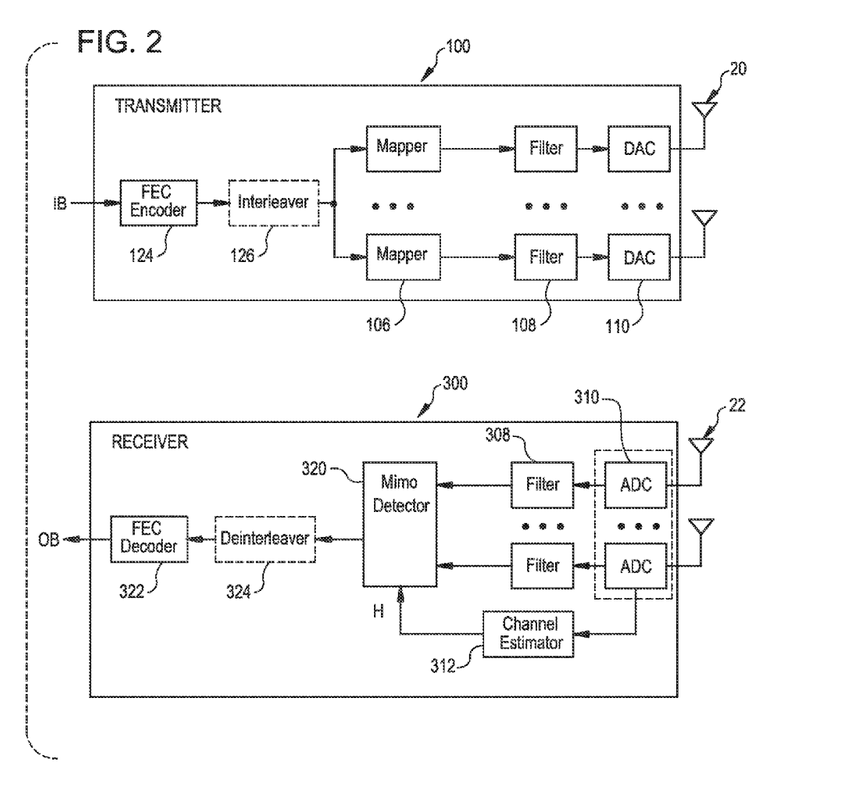
FIG. 2 illustrates an embodiment of a single-carrier FEC coded MIMO transmitter, and related receiver.

FIG. 2 illustrates a more detailed example of single carrier FEC coded MIMO transmitter and receiver. Typical transmitter baseband digital procedures are grouped as 100. As a counterpart, block 300 represents typical baseband elements of a receiver.

As well known to those skilled in the art, the block 100 further has associated therewith a FEC encoder 124, an interleaver 126, and a set of mapper blocks 106, filter blocks 108 and digital-to-analog (D/A) converters 110 in order to convert an input bit stream for transmission over the set of transmission antennas 20.

The receiver includes as distinguishable units the MIMO detector 320, which is the subject of an embodiment of the present disclosure, a deinterleaver 324, and a FEC decoder 322. Deinterleaver 324 implements the reciprocal permutation law of block 126.

The detector 320 receives as input the received signal Y, as shown e.g., in equation (1), the channel estimates, such as the channel estimation matrix H as shown in equation (1), and then it computes either a hard-decision estimate of the transmit sequence X, or bit soft-output information, generally shown as output bit stream OB. Unless otherwise stated, the bit soft-output generation will be referred to in the logarithmic domain with no loss of generality, i.e., it is intended the ideas will remain valid if other implementation choices are made, i.e., of regular probabilities instead of LLRs are dealt with.

Additionally, the block 300 has additionally associated therewith a set of analog-to-digital (A/D) converters 310 and filter blocks 308 for each of the antennas 22 of the receiver, providing the received data to the detector 320. Again those skilled in the art will appreciate the presence of a channel estimator 312 in the receiver block 300, which provides respective channel estimation data to the MIMO detector 320.

For this reason any channel estimator may be used without departing from the scope of this disclosure. Similarly any forward error correction (FEC) code may be used in the FEC encoder 124 and FEC decoder 322, such as Reed-Solomon, convolutional, low-density parity check code and turbo encoding schemes.

Again, these embodiments are for illustration only. Other embodiments of the systems 100, 300 and specifically of 320 could be used without departing from the scope of this disclosure.

The deinterleaver 324 and the interleaver 126 are optional in the sense that their usefulness depends on the adopted error correction code. In some cases they could be eliminated without impairing the performance of the transmitter and receiver.

Figure 3:
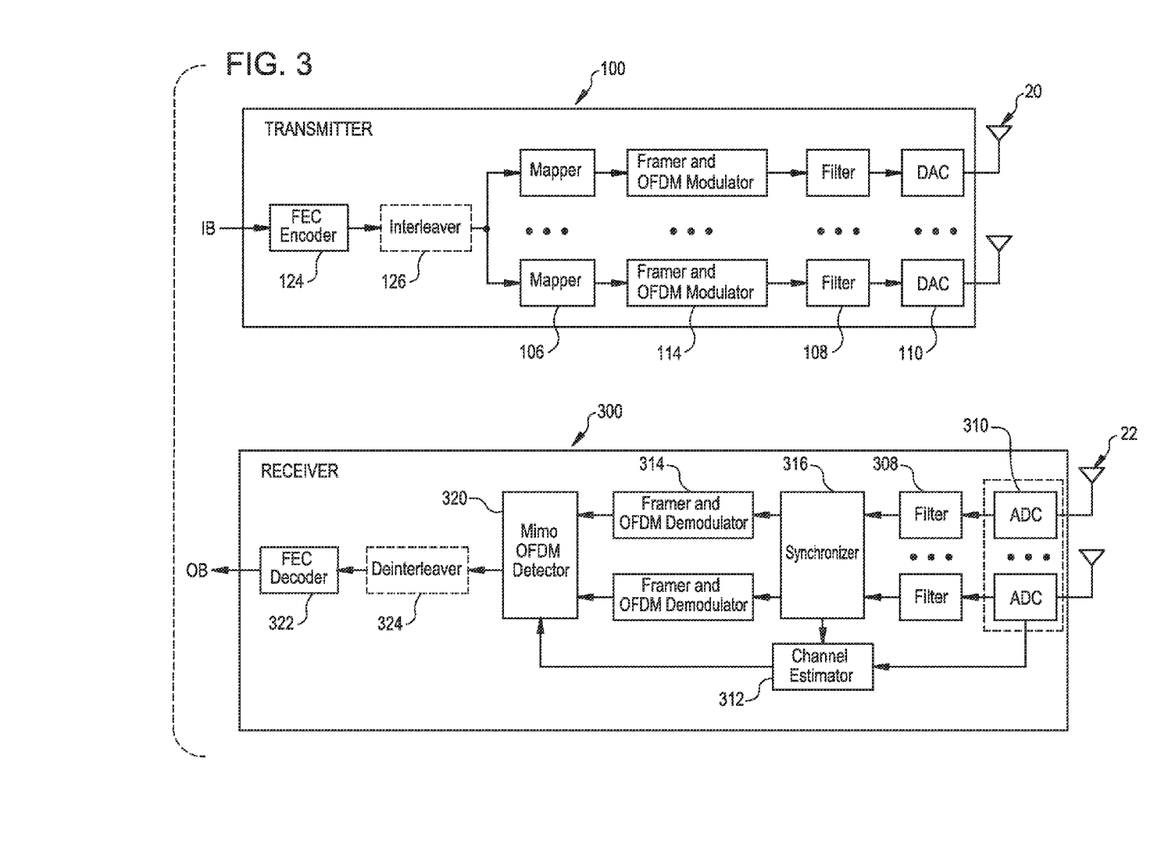
FIG. 3 illustrates an embodiment of FEC coded MIMO-OFDM transmitter, and related receiver.

FIG. 3 illustrates a more detailed example of FEC coded MIMO-OFDM transmitter and receiver. Typical transmitter baseband digital procedures are grouped as 100 and typical receiver baseband procedures are grouped as 300. In particular, it includes as distinguishable units the MIMO-OFDM detector 320, a deinterleaver 324, and a FEC decoder 322. Deinterleaver 324 implements the reciprocal permutation law of block 126. In comparison to the transmission system of FIG. 2, the system of FIG. 3 further includes a set of framing and OFDM modulator blocks 114 at the transceiver side and the respective OFDM demodulator and deframing blocks 314 at the receiver side. As well known to those skilled in the art a typical receiver further includes a synchronization block 316 and an OFDM channel estimation block 312.

Either system illustrated in FIG. 2 or FIG. 3 may be representative of uncoded MIMO or MIMO-OFDM systems respectively, by removing the FEC encoder 124, interleaver 126 if present, and related deinterleaver 324 if present, and FEC decoder 322 at the receiver side. In such cases a hard-output MIMO detector may be enough to detect communications from multiple antennas and generate the output bit stream.

Figure 4:
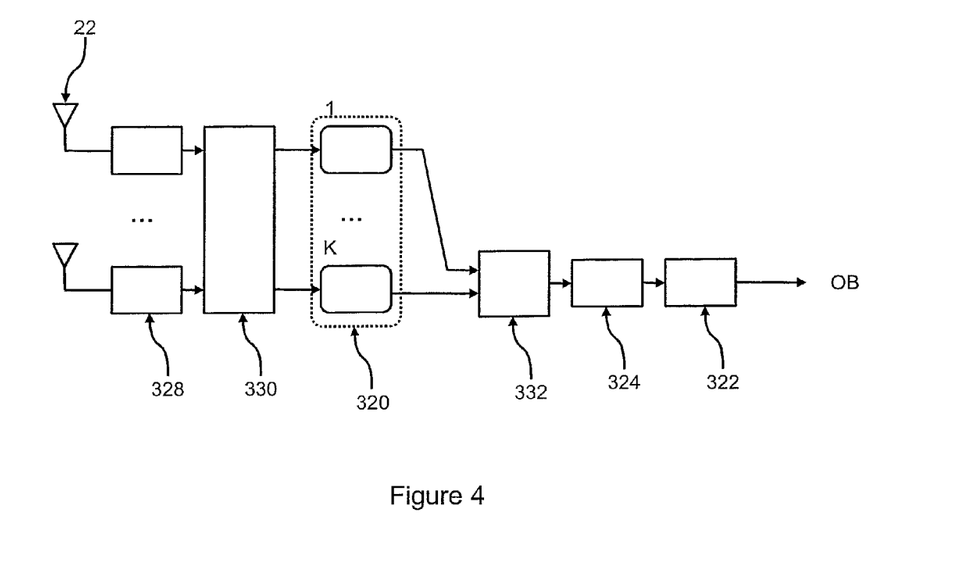
FIG. 4 illustrates an embodiment of an OFDM method for detecting communications from multiple sources.

FIG. 4 illustrates a method to implement the MIMO-OFDM detector 320.

The MIMO detector 320 in both figures receives as input the received sequence Y and the estimated CSI H relative to a set of OFDM subcarriers.

As well known to those skilled in the art, the data coming from the R antennas 22 of the receiver can be converted into the K OFDM subcarriers e.g., by means of a set of Fast Fourier Transformation (FFT) blocks 328 and a multiplexer 330.

At least one detector block 320 then processes the K OFDM subcarriers. This can be done serially, in parallel by means of K detector blocks, or by any combination of both. The parallel structure represented in FIG. 4 is a non-limiting example only. The outputs of the detector units 320 are then serialized by means of the parallel to serial (P/S) converter block 332. FIG. 4 uses a deinterleaver 324 having as input the bit soft-output information output by the detector 320, if soft-output information is generated. In this case the output of the deinterleaver feeds the decoder 332. If hard-output is generated, blocks 324 and 322 are not required.

In the following are described embodiments of both single-carrier and MIMO-OFDM detectors. Once again, these embodiments are for illustration only. Other embodiments of the systems 100, 300 and specifically 32, then detailed as 320 could be used without departing from the scope of this disclosure.

The detector uses as input the received signal (Y in (1)) and the channel estimates (matrix H in (1)), and then solves the minimization problem (2) by searching a subset of all the possible transmit sequences.

Specifically, an embodiment of the present disclosure concerns a detector composed of several stages. First, the (complex) channel matrix undergoes a "triangularization" process, meaning that through proper processing it is factorized into two or more product matrices, one of which is triangular. Then, the minimization problem (2) is translated into an equivalent one, and demodulation and bit soft-output calculation are carried out searching a subset of all the possible discrete-value sequences. Additionally, and optionally, all or part of the layers considered for the detection may be ordered employing a properly designed layer ordering technique.

Overall, an embodiment of the present disclosure achieves optimal performance for two transmit antennas; for more than two transmit antennas and hard-output, if the layers considered for the detection are taken in a suitable order, determined according to one of the methods according to an embodiment of the present disclosure, it achieves near-optimal performance; for more than two transmit antennas and soft-output, an embodiment achieves near-optimal performance which can be further enhanced if the layers considered for the detection are taken in a suitable order, determined according to one of the methods according to an embodiment of the present disclosure. In most cases, an embodiment keeps a much lower complexity as compared to a ML detection method and apparatus, and to the other state-of-the-art detectors having near-ML performance. Also, an embodiment provides a method to generate reliable soft-output metrics. Moreover, an embodiment is suitable for highly parallel hardware architectures, fundamental requirement for VLSI implementations, and for applications requiring a real-time (or in any case low latency) response.

In the following description of an embodiment, reference is made to the accompanying drawings which form a part hereof, and in which is shown by way of illustration a specific embodiment in which the disclosure may be practiced. It is to be understood that other embodiments may be utilized and structural changes may be made without departing from the scope of the present disclosure.

A purpose of an embodiment of the present disclosure is to provide a new method and apparatus for detecting multiple complex-valued symbols belonging to discrete constellations. Specifically, an embodiment of the present disclosure concerns a detector of multiple antenna communications that detects sequences of digitally modulated symbols transmitted by multiple antennas, or sources. Additionally and optionally, all—or part of—the layers considered for the detection may be ordered employing a suitably designed ordering technique.

An embodiment of the disclosure finds the closest vector (in case of two transmit antennas), or a close approximation of it (in case of more than two transmit antennas), to a received vector, corrupted by noise. An embodiment of the disclosure also gets (optimally, in case of two transmit sources) or closely approximates (for more than two transmit sources) the most likely sequences required for an optimal bit or symbol a-posteriori probability computation. If more than two transmit sources are present, the order of all, or part of, the sequence of layers considered for detection may affect the performance significantly. Overall, an embodiment of the present disclosure achieves optimal performance for two transmit antennas; for more than two transmit antennas and hard-output, if the layers considered for the detection are taken in a suitable order, determined according to a method according to an embodiment of the present disclosure, it achieves near-optimal performance; for more than two transmit antennas and soft-output, a method achieves near-optimal performance which can be further enhanced if the layers considered for the detection are taken in a suitable order, determined according to a method according to an embodiment of the present disclosure. In most cases, an embodiment of the disclosure is characterized by much lower complexity compared to a ML detection method and apparatus, and to the other state-of-the-art detectors having a near-ML performance. A major differentiating feature of an embodiment of the disclosure compared to the state of the art is represented by a reliable technique to compute bit soft output information, differently from other near-ML state-of-the-art-detectors. Moreover, an embodiment of the present disclosure is suitable for highly parallel hardware architectures, which is often a fundamental requirement for VLSI implementations and for applications requiring a real-time (or in any case low latency) response.

Figure 5A:
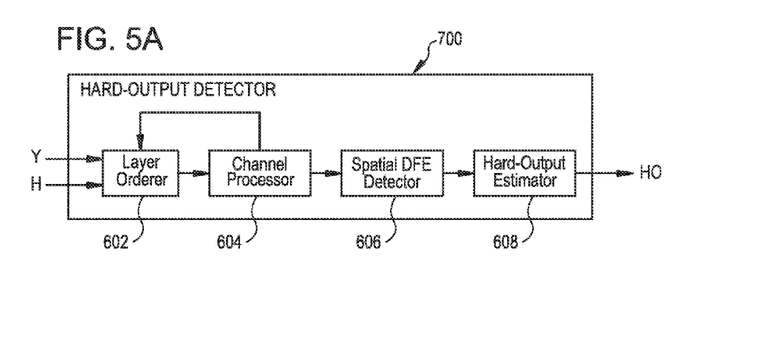
FIG. 5A and FIG. 5B are block diagrams illustrating embodiments of the present disclosure.
Figure 5B:
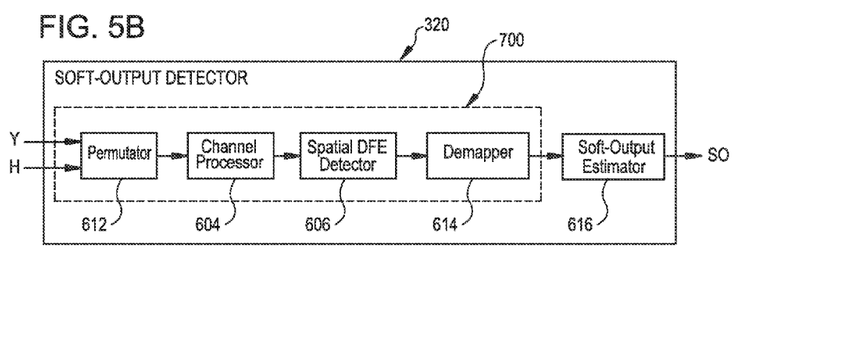

Specifically, an embodiment of the present disclosure concerns a detector composed of several stages, as shown in FIG. 5. Channel state information (CSI, matrix H in (1)) is assumed to be known at the receiver. A method includes a set of rules that allow one to design a MIMO detection system having as input the (complex) received vector, Y in (1); the (complex) channel paths between the transmit and receive antennas, entries of H; and the properties of the desired QAM (or PSK) constellation to which the symbols belong. It includes the steps of:

- pre-processing the complex-valued channel matrix in order to factorize it into product terms of which one is a triangular matrix;
- (optionally) ordering the sequence of all, or part of, the layers considered for the detection;
- performing hard decision detection and demapping, based on the search of a properly determined subset of transmit sequences;
- in alternative, the generation of bit soft output values, based on the search of a properly determined subset of transmit sequences, that very well approximate (and actually, optimally get, for two transmit antennas) the most reliable sequences for all the layers.

A layer ordering method includes the following sequence of steps, to be repeated a given number of times according to the implemented ordering technique: permuting pairs of columns of the channel matrix; preprocessing the permuted channel matrix in order to factorize it into product terms of which one is a triangular matrix; based on the processed channel coefficients; defining and properly computing the post-processing SNR for the considered layers; based on the value of the aforementioned SNRs, determining the order of the layers by applying a given criterion.

A general MIMO system can be represented as in Equation (1), valid for single carrier flat fading channel or also for wideband OFDM systems, in this last case per subcarrier. An embodiment of the present disclosure deals with a simplified yet near-optimal method to find the transmit sequence X maximizing the probability $$p(Y \mid X) \propto \exp\left[-\frac{1}{2\sigma_N^2}\|Y - HX\|^2\right] \qquad (3)$$

i.e., solving the minimization problem (2). The algorithm is comprised of the distinct stages shown in FIG. 5.

Channel Processing

In order to decouple the problem in turn for the different transmit antennas and efficiently determine a subset of sequences to consider for either soft output generation or hard-decision detection, it is useful to perform a channel matrix "triangularization" process, meaning that through proper processing it is factorized into two or more product matrices, one of which is triangular. It is understood that different matrix processing may be applied to H without departing from the scope of the present disclosure. Examples include, but are not limited to, QR and Cholesky decomposition procedures [32]. In the following QR will be used, without loss of generality.

Let t be the antenna index, with t=1, . . . T; a permutation matrix $\Pi(t)$ is introduced, which circularly shifts the elements of X (and consequently the order of the columns of H, too), such that the symbol $X_t$ under investigation moves to the last position:

$$\Pi_t = [U_{t+1} \ldots U_T U_1 \ldots U_t]^T \qquad (4)$$

where $U_t$ is a column of vector length T with all zeros but the t-th element equal to one.

It should be remarked that any permutation other than (4) where t is placed in the last position may be used without going beyond the scope of the present disclosure.

Then equation (1) can be rewritten as follows:

$$Y = H\Pi_t^{-1}\Pi_t X + N = H\Pi_t^T\Pi_t X + N \qquad (5)$$

T different QR decompositions are performed, one for each $\Pi_t$:

$$H\Pi_t^T = Q_t R_t \qquad (6)$$

where $Q_t$ is an orthonormal matrix of size R×T and $R_t$ is a T×T upper triangular matrix. Then, the Euclidean distance (ED) metrics can be written as:

$$D = -\frac{1}{N_0}\|Y - HX\|^2 = -\frac{1}{N_0}\|Y - Q_t R_t \Pi_t X\|^2 \qquad (7)$$

$$= -\frac{1}{N_0}\|Q_t^H Y - R_t \Pi_t X\|^2 = -\frac{1}{N_0}\|Y_t' - R_t X_t'\|^2$$

where $$Y_t' = Q_t^H Y \qquad (8)$$

and $X_t' = \Pi_t X$.

No change in the noise statistics is introduced by the QR decomposition into the equivalent noise term $N_t' = Q_t^H N$.

It is useful to enumerate the rows of $R_t$ from top to bottom and create a correspondence with the different transmit antennas (or layers), ordered as in $X_t'$. Then the QAM symbol $X_t$ is located in the T-th position of $X_t'$ and corresponds to the last row of $R_t$, which acts as an equivalent triangular channel. The demodulation principle is to select the T-th layer as the reference one and determine for it a list of candidate constellation symbols. Then, for each sequence in the list, interference is cancelled from the received signal and the remaining symbol estimates are determined through interference nulling and cancelling, or spatial DFE. Exploiting the triangular structure of the channel, the estimation of the remaining T−1 complex symbols may be simply implemented through a slicing operation to the closest QAM (or PSK) constellation symbol, thus entailing a negligible complexity.

Demodulation

A basic principle is to let the complex modulated symbol $X_t$ span all the possible (QAM or PSK) complex constellation S, or a properly selected subset thereof, denoted by C, with cardinality $S_C$.

From equation (7) follows:

$$-D = \frac{1}{N_0} \|Y_t' - R_t X_t'\|^2 \quad (9)$$

$$= \frac{1}{N_0} \left( \begin{array}{c} \left| Y_1^t - r_{1,1}^t X_1^t - \sum_{k=2}^{T} r_{1,k}^t X_k^t \right|^2 + \\ \left| Y_2^t - r_{2,2}^t X_2^t - \sum_{k=3}^{T} r_{2,k}^t X_k^t \right|^2 + \ldots + \\ |Y_T^t - r_{T,T}^t X_t|^2 \end{array} \right)$$

For every $X_t = \overline{X}$ the conditional decoded values of $X_1^t \ldots X_{T-1}^t$, are determined recursively according to a spatial DFE principle as:

$$\hat{X}_{T-1}^{tD}(\overline{X}) = \text{round}\left( \frac{Y_{T-1}^t - r_{T-1,T}^t \overline{X}}{r_{T-1,T-1}^t} \right) \quad (10)$$

$$\vdots$$

$$\hat{X}_1^{tD}(\overline{X}) = \text{round}\left( \frac{Y_1^t - \sum_{k=2}^{T-1} r_{1,k}^t \hat{X}_k^{tD} - r_{1,T}^t \overline{X}}{r_{1,1}^t} \right)$$

Denoting these T−1 conditional decisions as $X_{\{1,T-1\}}^{tD}(\overline{X})$, the resulting estimated sequence is:

$$\hat{X}_1^{tD}(\overline{X}) = \{\hat{X}_{\{1,T-1\}}^{tD}(\overline{X}), \hat{X}_t\} \quad (11)$$

and can be used as the estimate sequence of $X^D(X_t = \overline{X})$.

A hard-decision estimate of $X^D$ may then be obtained as:

$$\hat{X}^{tD} = \underset{\overline{X} \in C}{\text{argmax}}\{D(\hat{X}^{tD}(\overline{X}))\} \quad (12)$$

If $X_t$ spans all the possible constellation symbols and T=2, then $\hat{X}^{tD} \equiv X^D$, i.e., if $M_c$ is the number of bits per symbol, an embodiment of the disclosure achieves optimal ML performance by searching only $2^{M_c}$ sequences instead of $2^{2M_c}$ as would be required by the exhaustive search ML detector. If T>2, $\hat{X}^{tD} \neq X^D$ even if $X_t$ spans all the possible constellation symbols, because the procedure suffers by error propagations from the intermediate layers (in general, all except the first and last one). However, the detector may achieve near-optimal performance also in this case provided a suitable layer ordering technique, described in the following, is adopted.

Soft-Output Generation

Unless otherwise stated, the bit soft-output generation will be referred to in the logarithmic domain with no loss of generality, i.e., it is intended the ideas will remain valid if other implementation choices are made, i.e., of regular probabilities instead of LLRs are dealt with. The problem can be described as follows: the (logarithmic) APP ratio of the bit $b_k$, $k=1, \ldots, T \cdot M_c$ conditioned on the received channel symbol vector Y is:

$$L(b_k | Y) = \ln\frac{P(b_k = 1 | Y)}{(b_k = 0 | Y)} = \ln\frac{\sum_{X \in S^+} p(Y | X)p_a(X)}{\sum_{X \in S^-} p(Y | X)p_a(X)} \quad (13)$$

where $S^+$ is the set of $2^{T \cdot M_c - 1}$ bit sequences having $b_k = 1$, and similarly $S^-$ is the set of bit sequences having $b_k = 0$; $p_a(X)$ represent the a-priori probabilities of X.

From (3), and using the so-called "max-log" approximation to approximate the summation of exponentials involved in (13), one has:

$$\ln \sum_{X \in S^+} \exp[D(X)] \cong \ln \max_{X \in S^+} \exp[D(X)] = -\min_{X \in S^+} |D(X)| \quad (14)$$

where $D(X) \propto -\|Y - XH\|^2$ is the Euclidean distance term.

Neglecting the a-priori probabilities, as for the common case when they transmitted symbols are equiprobable, and using (14), then (13) can be re-written as:

$$L(b_k | Y) \cong \min_{X \in S^-} |D(X)| - \min_{X \in S^+} |D(X)| \quad (15)$$

In the remainder of the present document, we will refer to (15), unless otherwise stated, when dealing with the problem of bit APP generation.

An embodiment for the generation of the bit soft output information is to approximate the bit LLR max-log computation through the use of the simplified demodulation method (9)-(11).

The complex modulated symbol $X_t$ spans all the possible (QAM or PSK) complex constellation S, or a properly selected subset thereof, denoted by C, with cardinality $S_C$. For each of the $S_C$ possible values $X_t = \overline{X}$, a corresponding sequence $S_t(\overline{X}) = \hat{X}^{tD}(\overline{X})$ is determined through (11). The whole set of sequences of cardinality $S_C$ is then given by:

$$S_t = \left\{ \bigcup_{\forall \overline{X} \in C} S_t(\overline{X}) \right\} \quad (16)$$

Actually, it is typically not computationally expensive and may offer significant performance improvements to consider also the sequences X belonging to the other sets $S_j$ with $j \neq t$ when computing bit LLRs relative to $X_t$. Mathematically this means that instead of $S_t(\overline{X})$ the modified set $S_t'(X)$ can be used instead:

and $$S'_t(\overline{X}) = \left\{ \underset{X \in S_t(X) OR X \in S_{j \neq t}: \; X_t = X}{\mathrm{argmax}} \; D(X), \forall \, \overline{X} \in C \right\} \quad (17)$$

and $$S'_t = \bigcup_{\forall \overline{X} \in C} S'_t(\overline{X}) \quad (18)$$

In the following, it is understood that embodiments equally apply to both $S_t$ as shown in equation (16) and $S'_t$ (18) though reference will be made only to $S_t$ only to simplify the notation.

An embodiment of the disclosure then approximates equation (15) through:

$$L_{p,i} \cong \max_{X \in S_t^j(1)} D(X) - \max_{X \in S_t^j(0)} D(X) = D_1 - D_2 \quad (19)$$

where $S_t^j(1)$ and $S_t^j(0)$ are a set partitioning of $S_t$:

$$S_t^j(a) = \{ X \in S_t : b_{M_c(t-1)+j}(X) = a \}, a = \{0,1\}, \quad (20)$$

and where t is the t-th antenna with $1 \leq t \leq T$, j the j-th bit in the modulated symbol with $1 \leq j \leq M_c$ and I denotes the i-th bit in the sequence output by the detector with $I = M_c(t-1) + j$.

In order to compute the approximated max-log LLRs also for the bits corresponding to the other T−1 symbols in X, the algorithm computes the steps formerly described for other T−1 different layer dispositions (for a total of T permutations), where in turn each layer becomes the reference one only once. An example of such permutations includes, but is not limited to, equation (4). Overall, an embodiment of the disclosure achieves near-optimal performance using an overall number of considered sequences equal to $S_C T \leq 2^{M_c} T$, instead of $2^{TM_c}$ of the exhaustive search ML detector. In case of T=2 and $S_C = 2^{M_c}$, an embodiment of the disclosure achieves optimal LLR generation (optimal in the max-log sense, cfr. (14)).

SNR-Based Layer Ordering

The ordering of the layers (i.e., transmit antennas) considered for the successive DFE detection may have a very important impact on the performance in case of hard-output detection, as mentioned previously, i.e., if one wants to estimate $X^D$ (2) through $\hat{X}^{tD}$ (12). The post-detection SNR of the different layers can be determined based on the value of the diagonal elements of the triangular matrix $R_t$, proceeding from bottom to top and assuming perfect interference cancellation from the lower layers. If $r_{j,k}$ are the entries of $R_t$, the SNR for the generic k-th layer is given by:

$$SNR_k = \frac{|r_{k,k}|^2}{N_0} \quad (21)$$

The SNR of a given layer depends on the ordering considered for the detection of the transmitted symbols. A fundamental idea is to select as 'reference' (i.e., bottom) layer, for which $S_c$ candidate symbols in the complex constellation are searched, the one characterized by the worst SNR, and to order SNRs in a decreasing order (O-DFE) from layer T−1 up to the first layer. As already mentioned, this corresponds to a simplified approximated version of the optimal "maxi-min" ordering criterion established in [9] for O-DFE and generalized in [11] for ML-DFE, but nevertheless yields performance very close to the optimum.

As for [9], also for the QR processing described in the present document a fundamental property holds for $SNR_k$ (21), fundamental to keep a limited overall complexity of the algorithm: the invariance of $SNR_k$ to the disposition of the layers from 1 to j with j<k. The proof is omitted for brevity. As a consequence, proceeding from bottom (j=T) to top (j=1), there are j possible different values for $SNR_j$ that can be computed considering as many different layer permutations, where each of the j layers in the set is placed at the j-th position once and only once. The overall number of permutations to be considered is then equal to T(T+1)/2 instead of T!

For every considered layer permutation the columns of the channel matrix H are permuted accordingly prior to the QR processing; the QR is executed only partly, recalling that the QR computes the matrix R line by line from top to bottom and the matrix Q column wise from left to right. It follows that in one embodiment, the preferred set of layer index permutations should be optimized so that they differ for the least possible number of indexes.

From the above considerations the following layer ordering algorithm can be derived:
1) Enumerate the layers corresponding to the original channel matrix H according to the natural integer sequence $\pi_{T,1} = 1, 2, \ldots T$.
2) Compute the QR decomposition of the channel matrix H.
3) Start from the bottom layer (k=T). As $SNR_T$ is the only function of the layer in the last position, regardless of the disposition of the other layers, determine T possible different values for $SNR_T$. An efficient set of permutations is the following. Start from two initial permutations (cases a and b) and exchange the last element with each one of the T/2 $2^{nd}$ half elements, as:

Even number T: (22)

$\Pi_{T,1} = 1, 2, \ldots T$ $\Pi_{T,2} = 1, 2, \ldots T-2, T, T-1$

...

$\Pi_{T,\frac{T}{2}} = 1, 2, \ldots \frac{T}{2}, \frac{T}{2} + 2, \frac{T}{2} + 3, \ldots \frac{T}{2} + 1$ $\Pi_{T,\frac{T}{2}+1} = \frac{T}{2} + 1, \frac{T}{2} + 2, \ldots T, 1, 2, \ldots \frac{T}{2}$ $\Pi_{T,\frac{T}{2}+2} = \frac{T}{2} + 1, \frac{T}{2} + 2, \ldots T, 1, 2, \ldots \frac{T}{2} - 2, \frac{T}{2}, \frac{T}{2} - 1$

...

$\Pi_{T,T} = \frac{T}{2} + 1, \frac{T}{2} + 2, \ldots T, 2, 3, \ldots \frac{T}{2}, 1$ Odd number T:

$\Pi_{T,1} = 1, 2, \ldots T; \quad \Pi_{T,2} = 1, 2, \ldots T-2, T, T-1$

...

$\Pi_{T\lceil\frac{T}{2}\rceil} = 1, 2, \ldots \lfloor\frac{T}{2}\rfloor, \lfloor\frac{T}{2}\rfloor + 2, \lfloor\frac{T}{2}\rfloor + 3, \ldots \lfloor\frac{T}{2}\rfloor + 1$ $\Pi_{T\lceil\frac{T}{2}\rceil+1} = \lfloor\frac{T}{2}\rfloor + 1, \lfloor\frac{T}{2}\rfloor + 2, \ldots T, 1, 2, \ldots \lfloor\frac{T}{2}\rfloor$ $\Pi_{T\lceil\frac{T}{2}\rceil+2} = \lfloor\frac{T}{2}\rfloor + 1, \lfloor\frac{T}{2}\rfloor + 2, \ldots T, 1, 2, \ldots \lfloor\frac{T}{2}\rfloor - 2, \lfloor\frac{T}{2}\rfloor, \lfloor\frac{T}{2}\rfloor - 1$

...

$\Pi_{T,T} = \lfloor\frac{T}{2}\rfloor + 1, \lfloor\frac{T}{2}\rfloor + 2, \ldots T, 2, \ldots \lfloor\frac{T}{2}\rfloor, 1.$ The columns of H are permuted accordingly prior to undergoing the QR. Only the entries of R corresponding to the layer indexes that changed from one permutation to the other are updated.

1) The T SNR values are compared and the layer characterized by the minimum SNR is selected as the T-th one. Such layer becomes the 'reference' layer and then a set of possible candidate values are searched for it.
2) A similar sequence of operations is repeated for the layer k-th where k=T−1, ..., 2. At each stage, k different $SNR_k$ values are determined. Specifically, k permutations $\pi_{k,j}$ with j=1 ... k are selected, in order to compute $SNR_{k,j}$. A method is to minimize the processing complexity similarly to what described above for k=T. The criterion is then to select the k-th layer based on $$\max_j SNR_{k,j}.$$

The rationale is to reduce as much as possible the effect of error propagation, as for the O-DFE. The same ordering operations are repeated until k=2 as this will also determine the chosen layer for k=1.

3) Once the final layer sequence is determined, a possible final QR process is computed if required; then the ED metrics and the overall hard-output sequence estimates can be computed.

This method may be very powerful if the hard-output decision is generated. The overall processing complexity is in the order of $O(T^3)$ up to T=4. "Partial" ordering schemes may also be applied. The criterion used to select the bottom layer does not change. Then partial ordering schemes include applying the O-DFE criterion to a subset of layers, from just one up to the maximum number T−1.

For soft-output generation, however, the proposed ordering technique may be applied only partially as T parallel LLR computation processes are performed, where each layer is the reference. This implies that the layer ordering scheme is to be modified; more specifically, it typically cannot be applied to the layer considered first, for which $S_C$ cases are searched, and is instead applied starting from layer T−1. This is true for each of T sets of T−1 layers. In fact T parallel QR processes are computed where T different layers in turn are the reference; in each case, the remaining T−1 layers typically can only be ordered in a decreasing order SNR, as for the O-DFE. In other words, for every considered permutation $\pi_j$, with j=1 ... T, decreasing order SNR of layers from $\pi_j(T-1)$ to $\pi_j(1)$ can be performed to enhance the performance.

FIG. 5A illustrates an example embodiment for estimating hard-output estimates of symbols transmitted by multiple sources;

FIG. 5B illustrates an example embodiment for detecting communications from multiple sources and generating as output soft-output information.

Channel state information is assumed to be known at the receiver. The receiver includes a set of rules having as input: the (complex) received vector observations, the (complex) gain channel paths between the transmit and receive antennas, and the properties of the desired QAM (or PSK) constellation to which the symbols belong.

Specifically, FIG. 5A illustrates an embodiment of a hard-output detector of multiple complex-valued symbols belonging to discrete constellations that detects sequences of digitally modulated symbols transmitted by multiple sources. The detector finds a closest vector to a received vector, or a close approximation of it, having as input the received sequence and an (assumed known) channel state information matrix.

FIG. 5B illustrates an embodiment of a soft-output detector of multiple complex-valued symbols belonging to discrete constellations that detects sequences of digitally modulated symbols transmitted by multiple sources, that gets (optimally, in case of two transmit sources) or closely approximates (for more than two transmit sources) the most likely sequences required for an optimal bit or symbol a-posteriori probability computation, having as input the received sequence and an (assumed known) channel state information matrix.

Referring to FIG. 5A, block 602 performs an optional ordering of the layers, i.e., to dispose the complex symbols to be detected and correspondingly the columns of the channel matrix H (cfr. (1)), performing for instance the steps (21)-(22). In a preferred embodiment block 602 works recursively in combination with the channel processing block 604, as for a given layer disposition block 602 receives from it the post-detection SNR to perform layer selection based on suitable criteria. After a final layer ordering has been determined, a further channel triangularization step is performed as described below.

Block 604 pre-processes the complex-valued channel matrix H in order to obtain a triangular matrix. Based on the result of this processing it also processes the complex-valued received vector Y. An example of such processing includes, but is not limited to, equations (6) and (8).

Block 606 performs a spatial DFE detection based on reference values assigned to the symbol corresponding to the bottom layer of a triangular matrix; an example includes, but is not limited to, (10)-(11). The operations are performed for a set of candidate values assigned to such reference symbol, and the corresponding value of the Euclidean distance (7) is stored for further use.

Block 608 computes a hard-output (HO) estimate of the transmit sequence by computing (12).

Referring to FIG. 5B, Block 700 groups the operations to be repeated a number of times equal to the number of transmit antennas.

Block 612 disposes the complex symbols (or layers) to be detected and correspondingly the columns of the channel matrix H (cfr. (1)) so that in turn each layer becomes the reference one only once. An example of such permutations includes, but is not limited to, equation (4).

Block 614 performs bit demapping of the sequences generated and stored through block 606 and updates the metrics $D_1$ and $D_2$ of (19).

Block 616 computes the soft output (SO) LLRs (19) by using the final values obtained for the metrics $D_1$ and $D_2$ by considering the whole set of $TS_C$ sequences generated through blocks 700.

A system, such as a wireless computer modem, may include a receiver, a transmitter, or both a receiver and transmitter such as the receivers and transmitters discussed above.

The foregoing description of one or more embodiments of the disclosure has been presented for the purposes of illustration and description. It is not intended to be exhaustive or to limit the disclosure to the precise form disclosed. Many modifications and variations are possible in light of the above teaching. It is intended that the scope of the disclosure not be limited by this detailed description.

REFERENCES

The following references are incorporated by reference herein:

[1] I. E. Telatar, "Capacity of Multi-Antenna Gaussian Channels," Eur. Trans. Tel, 10, 6, 585-595, November, 1999.
[2] G. J. Foschini and M. Gans, "On the Limits of Wireless Communication in a Fading Environment," Wireless Pers. Comm., 6, 311-355, March, 1998.
[3] IEEE P802.11n™/D2.0, "Draft Amendment to [ . . . ]—Part 11: Wireless LAN Medium Access Control (MAC) and Physical Layer (PHY) specifications: Enhancements for Higher Throughput", A. Stephens et al.
[4] IEEE Project P802.16-2004/Cor1-D5, Draft Corrigendum to IEEE Standard for Local and Metropolitan Area Networks—Part 16: Air Interface for Fixed Broadband Wireless Access Systems.
[5] Requirements and recommendations for WiMAX Forum™ Mobility Profiles, WiMAX1 Service Providers Working Group, November 2005.
[6] W. van Etten, "Maximum Likelihood Receiver for Multiple Channel Transmission Systems", IEEE Trans. on Comms, Vol. 24, No. 2, pp. 276-283, February 1976.
[7] H. V. Poor and S. Verdu', "Probability of Error in MMSE Multiuser Detection", IEEE Trans, on Information Theory, Vol. 43, May 1997, pp. 858-871.
[8] P. W. Wolniansky, G. J. Foschini, G. D. Golden, R. A. Valenzuela, "V-BLAST: An Architecture for Realizing Very High Data Rates Over the Rich-Scattering Wireless Channel," invited paper, Proc. ISSSE-98, Pisa, Italy, Sep. 29, 1998.
[9] G. J. Foschini, G. D. Golden, R. A. Valenzuela, P. W. Wolniansky, "Simplified Processing for High Spectral Efficiency Wireless Communications employing multi-element arrays," IEEE Journal on Selected Areas in Communications, vol. 17, no. 11, pp. 1841-1852, November 1999.
[10] W.-J. Choi, R. Negri and J. M. Cioffi, "Combined ML and DFE Decoding for the V-BLAST System", Proc. IEEE Int. Conf. on Communications, Vol. 3, pp. 1243-1248, June 2000. [11] Y. Li and Z. Q. Luo, "Parallel Detection for V-BLAST System", IEEE GLOBECOM, Vol. 1, pp. 340-344, May 2002.
[12] D. W. Waters and J. R. Barry, "The Chase Family of Detection Algorithms for Multiple-Input Multiple-Ouput Channels", IEEE GLOBECOM, Vol. 4, pp. 2635-2639, November 2004.
[13] D. W. Waters and J. R. Barry, "The Chase Family of Detection Algorithms for Multiple-Input Multiple-Ouput Channels", Submitted to IEEE Trans, on Information Theory, September 2005
[14] L. G. Barbero and John S. Thompson, "Rapid Prototyping of a Fixed-Throughput Sphere Decoder for MIMO Systems", IEEE Int. Conf. on Communications, June 2006.
[15] E. Agrell, T. Eriksson et al., "Closest Point Search in Lattices," IEEE Trans. on Inf. Theory, Vol. 48, No. 8, August 2002.
[16] M. O. Damen, A. Chkeif and J.-C. Belfiore, "Lattice Codes Decoder for Space-Time Codes", IEEE Commun. Letters, Vol. 4, No. 5, pp. 161-163, May 2000.
[17] E. Viterbo, J. Boutros, "A Universal Lattice Code Decoder for Fading Channels," IEEE Trans, on Inf. Theory, Vol. 45, No. 5, July 1999.
[18] Damen, El Gamal, G. Caire, "On Maximum-Likelihood Detection and the Search for the Closest Lattice Point," IEEE Trans, on Inf. Theory, Vol. 49, No. 10, October 2003.
[19] A. Burg et al., "VLSI implementation of MIMO detection using the sphere decoding algorithm", IEEE Journ. Solid-State Circuits, Vol. 40, No. 7, pp. 1566-1577, July 2005.
[20] Van Nee, Van Zelst, "Maximum likelihood decoding in a space division multiplexing system," Awater, Proc. VTC 2000, vol. 1, 6-10.
[21] IEEE 802.11-05/0149M, "WWiSE Proposal: High throughput extension to the 802.11 Standard," C. Kose, B. Edwards et al.
[22] B. Hassibi, "An efficient square-root algorithm for BLAST," in Proc. ICASSP, Istanbul, Turkey, pp. 11737-11740, June 2000.
[23] D. Wübben, R. Bóhnke, J. Rinas, V. Kuhn, and K. Kammeyer, "Efficient algorithm for decoding layered space-time codes," Electronic Letters, vol. 37, no. 22, pp. 1348-1350, October, 2001.
[24] D. W. Waters and J. R. Barry, "Noise-predictive decision-feedback detection for multiple-input multiple-output channels," in press, IEEE Trans. on Sig. Proc, vol. 53, no. 5, pp. 1852-1859, May 2005.
[25] B. Hochwald, S. ten Brink, "Achieving Near-Capacity on a Multiple-Antenna Channel," IEEE Trans. on Comms., Vol. 51, No. 3, March 2003.
[26] M. S. Yee, "Max-log Sphere Decoder," ICASSP 2005.
[27] J. Boutros et al, "Soft-input soft-output lattice sphere decoder for linear channels," Globecom 2003.
[28] IEEE 802.11-04/898M, N. Moschini, M. Siti et al., "STMicroelectronics Partial Proposal for LDPCC as optional coding technique for IEEE 802.11 TGn High Troughput Standard", August 2004.
[29] D. Zuyderhoff, X. Wautelet et al., "MMSE Turbo Receiver for space-frequency bit-interleaved coded OFDM", IEEE Vehicular Technology Conference, Vol. 1, October 2003, pp. 567-571.
[30] IEEE 802.11-03/940M, "IEEE P802.11, Wireless LANs—TGn Channel Models"—Jan. 9, 2004
[31] A. D. Murugan, El Gamal, M. O. Damen and G. Caire, "A Unified Framework for Tree Search Decoding: Rediscovering the Sequential Decoder", submitted to IEEE Trans, on Information Theory, May 2005.
[32] G. H. Golub and C. F. Van Loan, "Matrix Computations", Johns Hopkins University Press, Baltimore, Md., 1996

The invention claimed is:
1. A method, comprising:
receiving at a receiver a transmitted sequence of digitally modulated symbols, each symbol of the transmitted sequence originating from a respective one of a number of multiple transmit sources;
processing equations of a complex-domain representation of a system through which the transmitted sequence propagates to obtain a triangular matrix; and
performing, at the receiver, at least one of: (i) hard-decision detection of the transmitted sequence and demapping of corresponding bits based on a reduced-complexity parallel search of a subset of all possible values of the transmitted sequence, the reduced-complexity parallel search based on the triangular matrix, and (ii) generation of bit soft-output values based on the reduced-complexity parallel search, a number of values in the subset being less than or equal to a product of factors, one of the factors being equal to the number of multiple transmit sources; and wherein the reduced-complexity parallel search comprises solving a minimization problem using values of a candidate sequence, the values of the candidate sequence obtained by:

identifying a set of possible values for the complex values of one or more reference transmitted complex symbols, the possible values representing candidate values; and obtaining the complex values of one or more remaining symbols through spatial-decisions feedback equalization starting from each candidate value of the one or more reference symbols.

2. The method of claim 1, wherein:

channel-state information and received observations are known at the receiver;

the channel-state information comprises a complex matrix, the complex matrix comprising entries representing complex-gain channel paths between transmit and receive antennas; and the received observations comprise a complex vector.

3. The method of claim 1, further comprising receiving, as input to a set of rules, one or more properties of a desired quadrature amplitude modulation (QAM) or phase shift keying (PSK) constellation to which the symbols belong.

4. The method of claim 1, wherein processing the equations of the complex-domain representation of the system comprises:

factorizing a channel matrix into an orthogonal matrix and the triangular matrix; and multiplying the transpose conjugate of the orthogonal matrix by the complex received vector.

5. The method of claim 4, wherein:

a number of receive antennas is equal to a number of transmit antennas minus one; and processing the equations of the complex-domain representation comprises factorizing the channel matrix into an orthogonal matrix and the triangular matrix with its last row eliminated.

6. The method of claim 1, wherein processing the equations of the complex-domain representation of the system comprises:

forming a Gram matrix using a channel matrix;

performing a Cholesky decomposition of the Gram matrix;

calculating the called Moore-Penrose matrix inverse of said channel matrix, resulting in a pseudoinverse matrix; and multiplying said pseudoinverse matrix by a complex received vector that represents the transmitted sequence.

7. The method of claim 1, further comprising:

wherein the multiple sources comprise more than two sources; and ordering at least some layers corresponding to the transmitted symbols based on a post-processing signal-to-noise ratio of different layers.

8. The method of claim 1, wherein:

the reduced-complexity parallel search at least closely approximates one or more most likely sequences required for an optimal bit or symbol a-posteriori probability computation; and the reduced-complexity parallel search comprises repeating the identifying and obtaining steps a number of times equal to a number of transmit antennas, each time associated with a different disposition of layers corresponding to the transmitted symbols, each layer being a reference layer in only one of the dispositions.

9. The method of claim 1 wherein the number of values in the subset is less than or equal to a product of the number of multiple sources and a number of all possible values of one of the transmitted symbols.

10. The method of claim 1 wherein the number of values in the subset is less than or equal to a product of two and only two factors, one and only one of the factors being equal to the number of multiple transmit sources.

11. The method of claim 1 wherein the number of values in the subset is less than or equal to a linear function of the number of multiple transmit sources.

12. The method of claim 1 wherein the number of values in the subset is less than or equal to a value that is proportional to the number of multiple transmit sources to the first power.

13. A non-transitory tangible computer-readable medium having computer-executable instructions that, when executed, cause at least one computing apparatus:

to process equations of a complex-domain representation of a system through which a transmitted sequence of digitally modulated symbols propagates to obtain at least one matrix, one of which is a triangular matrix, each symbol of the transmitted sequence originating from a respective one of a number of multiple transmit sources; and perform a hard-decision detection of the transmitted sequence and demapping of corresponding bits based on a reduced-complexity parallel search of a subset of all possible values of the transmitted sequence, the reduced-complexity parallel search based on the triangular matrix, a number of values in the subset being less than or equal to a product of factors, one of the factors being equal to the number of multiple transmit sources, and wherein the reduced-complexity parallel search comprises solving a minimization problem using values of a candidate sequence, the values of the candidate sequence obtained by:

identifying a set of possible values for the complex values of one or more reference transmitted complex symbols, the possible values representing candidate values; and obtaining the complex values of one or more remaining symbols through spatial-decisions feedback equalization starting from each candidate value of the one or more reference symbols.

14. The non transitory computer-readable medium of claim 13 wherein the instructions, when executed, cause at least one computing apparatus to generate bit soft-output values based on the reduced-complexity parallel search.

15. The non transitory computer-readable medium of claim 13 wherein:

channel-state information and received observations are known at the receiver;

the channel-state information comprises a complex matrix, the complex matrix comprising entries representing complex-gain channel paths between transmit and receive antennas; and the received observations comprise a complex vector.

16. The non transitory computer-readable medium of claim 13, wherein the instructions, when executed, cause at least one computing apparatus to receive, as input to a set of rules, one or more properties of a desired quadrature amplitude modulation (QAM) or phase shift keying (PSK) constellation to which the symbols belong.

17. The non transitory computer-readable medium of claim 13, wherein the instructions, when executed, cause at least one computing apparatus to process the equations of the complex-domain system representation by:

factorizing a channel matrix into an orthogonal matrix and a triangular matrix; and multiplying the transpose conjugate of the orthogonal matrix by the complex received vector.

18. The non transitory computer-readable medium of claim 17 wherein:
a number of receive antennas is equal to a number of transmit antennas minus one; and
wherein the instructions, when executed, cause at least one computing apparatus to process the equations of the complex-domain system representation by factorizing the channel matrix into an orthogonal matrix and a triangular matrix with its last row eliminated.

19. The non transitory computer-readable medium of claim 13 wherein the instructions, when executed, cause at least one computing apparatus, to process the equations of the complex-domain system representation by:
forming a Gram matrix using a channel matrix;
performing a Cholesky decomposition of the Gram matrix;
calculating the called Moore-Penrose matrix inverse of said channel matrix, resulting in a pseudoinverse matrix; and
multiplying said pseudoinverse matrix by a complex received vector that represents the transmitted sequence.

20. The non transitory computer-readable medium of claim 13 wherein the number of values in the subset is less than or equal to a product of the number of multiple sources and a number of all possible values of one of the transmitted symbols.

21. The non transitory computer-readable medium of claim 13 wherein the number of values in the subset is less than or equal to a product of two and only two factors, one and only one of the factors being equal to the number of multiple transmit sources.

22. The non transitory computer-readable medium of claim 13 wherein the number of values in the subset is less than or equal to a linear function of the number of multiple transmit sources.

23. The non transitory computer-readable medium of claim 13 wherein the number of values in the subset is less than or equal to a value that is proportional to the number of multiple transmit sources to the first power.

24. A method, comprising:
receiving a transmitted sequence of digitally modulated symbols, each symbol of the transmitted sequence originating from a respective one of a number of multiple transmit sources;
processing equations of a complex-domain representation of a system through which the transmitted sequence propagates to obtain a triangular matrix; and
performing hard-decision detection of the transmitted sequence and demapping of corresponding bits based on a parallel reduced complexity search of a subset of all possible values of the transmitted sequence, the parallel reduced-complexity search based on the triangular matrix, a number of values in the subset being less than or equal to a product of factors, one of the factors being equal to the number of multiple transmit sources, and wherein the parallel reduced-complexity search comprises solving a minimization problem using values of a candidate sequence, the values of the candidate sequence obtained by:
identifying a set of possible values for the complex values of one or more reference transmitted complex symbols, the possible values representing candidate values; and
obtaining the complex values of one or more remaining symbols through spatial-decisions feedback equalization starting from each candidate value of the one or more reference symbols.

25. The method of claim 24 wherein the number of values in the subset is less than or equal to a product of the number of multiple sources and a number of all possible values of one of the transmitted symbols.

26. The method of claim 24 wherein the number of values in the subset is less than or equal to a product of two and only two factors, one and only one of the factors being equal to the number of multiple transmit sources.

27. The method of claim 24 wherein the number of values in the subset is less than or equal to a linear function of the number of multiple transmit sources.

28. The method of claim 24 wherein the number of values in the subset is less than or equal to a value that is proportional to the number of multiple transmit sources to the first power.

29. A method, comprising:
receiving a transmitted sequence of digitally modulated symbols, each symbol of the transmitted sequence originating from a respective one of a number of multiple transmit sources;
processing equations of a complex-domain representation of a system through which the transmitted sequence propagates to obtain a triangular matrix; and
generating bit soft-output values based on a reduced-complexity parallel search of a subset of all possible values of the transmitted sequence the reduced-complexity parallel search based on the triangular matrix, a number of values in the subset being less than or equal to a product of factors, one of the factors being equal to the number of multiple transmit sources; and wherein the reduced-complexity parallel search comprises solving a minimization problem using values of a candidate sequence, the values of the candidate sequence obtained by:
identifying a set of possible values for the complex values of one or more reference transmitted complex symbols, the possible values representing candidate values; and
obtaining the complex values of one or more remaining symbols through spatial-decisions feedback equalization starting from each candidate value of the one or more reference symbols.

30. The method of claim 29 wherein the number of values in the subset is less than or equal to a product of the number of multiple sources and a number of all possible values of one of the transmitted symbols.

31. The method of claim 29 wherein the number of values in the subset is less than or equal to a product of two and only two factors, one and only one of the factors being equal to the number of multiple transmit sources.

32. The method of claim 29 wherein the number of values in the subset is less than or equal to a linear function of the number of multiple transmit sources.

33. The method of claim 29 wherein the number of values in the subset is less than or equal to a value that is proportional to the number of multiple transmit sources to the first power.

34. A non-transitory tangible computer-readable medium having computer-executable instructions that, when executed, cause at least one computing apparatus:
to process equations of a complex-domain representation of a system through which a transmitted sequence of digitally modulated symbols propagates to obtain at least one matrix, one of which is a triangular matrix, each symbol of the transmitted sequence originating from a respective one of a number of multiple transmit sources; and
generate bit soft-output values based on a parallel reduced-complexity search of a subset of all possible values of the transmitted sequence, the parallel reduced-complexity search based on the triangular matrix, a number of values in the subset being less than or equal to a product of factors, one of the factors being equal to the number of multiple transmit sources, and wherein the parallel reduced-complexity search comprises solving a minimization problem using values of a candidate sequence, the values of the candidate sequence obtained by:
- identifying a set of possible values for the complex values of one or more reference transmitted complex symbols, the possible values representing candidate values; and
- obtaining the complex values of one or more remaining symbols through spatial-decisions feedback equalization starting from each candidate value of the one or more reference symbols.

35. The non transitory computer-readable medium of claim 34 wherein the number of values in the subset is less than or equal to a product of the number of multiple sources and a number of all possible values of one of the transmitted symbols.

36. The non transitory computer-readable medium of claim 34 wherein the number of values in the subset is less than or equal to a product of two and only two factors, one and only one of the factors being equal to the number of multiple transmit sources.

37. The non transitory computer-readable medium of claim 34 wherein the number of values in the subset is less than or equal to a linear function of the number of multiple transmit sources.

38. The non transitory computer-readable medium of claim 34 wherein the number of values in the subset is less than or equal to a value that is proportional to the number of multiple transmit sources to the first power.

* * * * *